(12) United States Patent
Grobis et al.

(10) Patent No.: US 8,213,103 B2
(45) Date of Patent: Jul. 3, 2012

(54) WRITE SYNCHRONIZATION IN PATTERNED MAGNETIC MEDIA

(75) Inventors: Michael K. Grobis, San Jose, CA (US); Manfred E. Schabes, Saratoga, CA (US)

(73) Assignee: HGST Netherlands, B.V., Amsterdam (NL)

( * ) Notice: Subject to any disclaimer, the term of this patent is extended or adjusted under 35 U.S.C. 154(b) by 70 days.

(21) Appl. No.: 12/639,838

(22) Filed: Dec. 16, 2009

(65) Prior Publication Data

US 2011/0141610 A1 Jun. 16, 2011

(51) Int. Cl.
*G11B 5/09* (2006.01)

(52) U.S. Cl. ............ 360/51; 360/25; 360/48; 360/77.02

(58) Field of Classification Search ........................ None
See application file for complete search history.

(56) References Cited

U.S. PATENT DOCUMENTS

| | | | | |
|---|---|---|---|---|
| 4,309,726 A * | 1/1982 | Tanaka et al. | .................. | 360/32 |
| 6,185,175 B1 * | 2/2001 | Zook | .......................... | 369/53.35 |
| 6,332,207 B1 * | 12/2001 | Southerland et al. | ......... | 714/763 |
| 6,587,294 B1 * | 7/2003 | Ushio et al. | ..................... | 360/53 |
| 6,620,532 B2 | 9/2003 | Aoyama | | |
| 6,671,111 B2 * | 12/2003 | Ottesen et al. | .................. | 360/31 |
| 6,738,207 B1 | 5/2004 | Belser et al. | | |
| 6,754,017 B2 * | 6/2004 | Rettner et al. | .................. | 360/51 |
| 7,009,793 B2 * | 3/2006 | Yamazaki | ....................... | 360/51 |
| 7,039,141 B2 * | 5/2006 | Watanabe et al. | ............. | 375/355 |
| 7,050,251 B2 | 5/2006 | Lundstrom | | |
| 7,133,233 B1 * | 11/2006 | Ray et al. | ........................ | 360/67 |
| 7,324,294 B2 | 1/2008 | Moser | | |
| 7,333,280 B1 * | 2/2008 | Lifchits et al. | .................. | 360/51 |
| 7,561,365 B2 * | 7/2009 | Noguchi et al. | ................. | 360/75 |
| 7,729,074 B2 * | 6/2010 | Venkataramani et al. | ...... | 360/51 |
| 7,880,999 B2 * | 2/2011 | Benakli et al. | .................. | 360/66 |
| 8,116,022 B2 * | 2/2012 | Sakurai et al. | .................. | 360/48 |
| 2005/0007684 A1 * | 1/2005 | Watanabe et al. | .............. | 360/51 |
| 2006/0119965 A1 * | 6/2006 | Ohno | ............................... | 360/51 |
| 2007/0211360 A1 * | 9/2007 | Ashikaga et al. | .............. | 360/29 |
| 2008/0074773 A1 | 3/2008 | Izumi | | |
| 2008/0074774 A1 | 3/2008 | Izumi | | |
| 2008/0074777 A1 | 3/2008 | Fukazawa | | |
| 2008/0304173 A1 | 12/2008 | Albrecht | | |
| 2009/0002867 A1 | 1/2009 | Gage | | |
| 2009/0067082 A1 | 3/2009 | Albrecht | | |
| 2009/0091854 A1 | 4/2009 | Tang | | |
| 2009/0116352 A1 * | 5/2009 | Itakura | ........................ | 369/47.48 |
| 2009/0244756 A1 * | 10/2009 | Itakura et al. | ................... | 360/31 |
| 2010/0202079 A1 * | 8/2010 | Buch et al. | ....................... | 360/51 |

FOREIGN PATENT DOCUMENTS

| | | |
|---|---|---|
| JP | 2001243601 | 9/2001 |
| JP | 2003157507 | 5/2003 |
| JP | 2003281701 | 10/2003 |
| JP | 2004199806 | 7/2004 |

* cited by examiner

*Primary Examiner* — Dismery Mercedes

(74) *Attorney, Agent, or Firm* — Duft Bornsen & Fishman, LLP

(57) ABSTRACT

Systems and methods for synchronizing write signals are disclosed. In one embodiment, a compensation system is implemented within a disk drive that receives a synchronization signal read from a patterned magnetic disk by a read head. The compensation system processes the synchronization signal to compensate for noise sensed by the read head while a write head writes to the disk based on a write signal. The adjustment module is operable to adjust the write signal based on the processed synchronization signal so that the write signal is synchronized to the pattern on the disk.

27 Claims, 9 Drawing Sheets

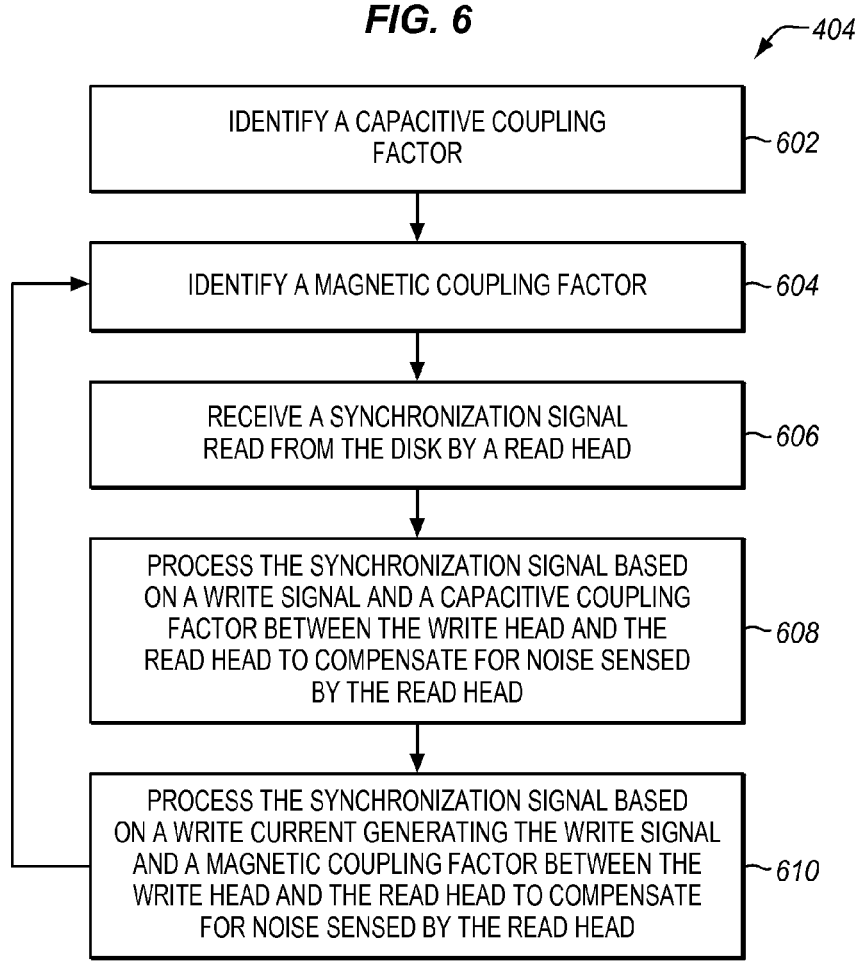
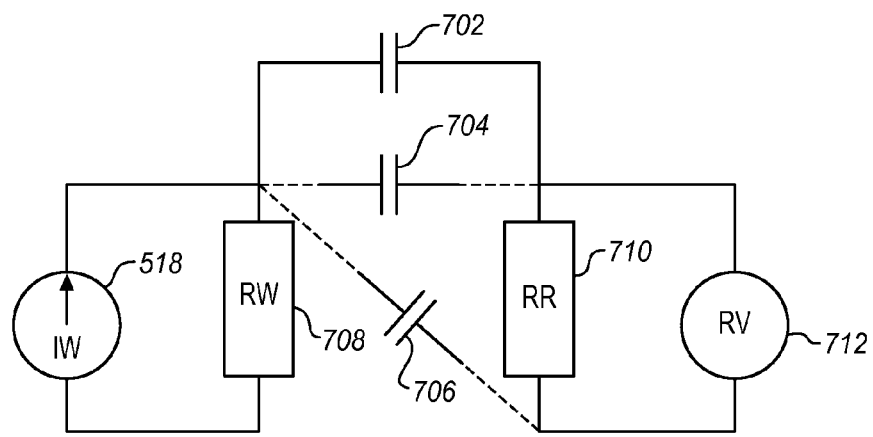

WRITE SYNCHRONIZATION IN PATTERNED MAGNETIC MEDIA

BACKGROUND

1. Field of the Invention

The invention is related to the field of magnetic disk drive systems and, in particular, to patterned magnetic media.

2. Statement of the Problem

Many computer systems use magnetic disk drives for mass storage of information. Magnetic disk drives typically include one or more sliders that include a read head and a write head. A suspension arm holds the slider above a magnetic disk. When the disk rotates, an airflow generated by the rotation of the disk causes an air-bearing surface (ABS) side of the slider to ride at a particular height above the disk. The height depends on the shape of the ABS. As the slider rides on the air bearing, an actuator moves the suspension arm to position the read head and the write head over selected tracks of the disk.

A conventional disk is divided into data fields and servo fields. The data fields are comprised of a plurality of data sectors where actual data is stored. In the data fields, the magnetic surface of the disk is divided into small magnetic regions, each of which is used to encode a single binary unit of information. The magnetic regions include a few dozen magnetic grains forming a magnetic dipole, which generates a highly localized magnetic field. The write head magnetizes a magnetic region by generating a strong local magnetic field to store a bit of data within the magnetic region during a write process. The read head senses the magnetic dipole of the magnetic region to read the bit of data during a read process.

The servo fields are comprised of a plurality of servo sectors that are used to assist in reading and writing to the data sectors, such as by positioning the read head and the write head over the center of tracks, reading a synchronization signal, etc. When the write process is performed on the disk, the read head and the write head are positioned over the tracks based on a positioning signal that is read from the servo sectors on the disk. The servo sectors include burst fields that are used to guide the read head and the write head to the proper position within data tracks on the disk.

As the areal density of the disk increases, the super-paramagnetic effect causes reliability problems for magnetic data storage. The super-paramagnetic effect occurs when the magnetic regions on the disk become so tiny that ambient temperature can reverse the orientation of their magnetic dipole. The result is that the bit is reversed and the data encoded by the bit is corrupted.

One solution to the problems posed by the super-paramagnetic effect is to pattern the disk. A patterned disk is created as an ordered array of discrete magnetic islands, with each island capable of storing an individual bit. Because each island represents an individual magnetic domain, the patterned disk is thermally stable and higher densities may be achieved. One consequence of using patterned disks is that the write process must be synchronized to the magnetic islands patterned on the disk. As the disk rotates and the islands continually pass underneath the write head within the slider, the frequency and phase of the write signal for the write head is timed so that the desired magnetic state is written to the islands passing directly underneath the write head. Imprecision in the synchronization of the write signals with the passage of the islands increases the probability that the islands will be written incorrectly and the data will be corrupted. Various publications describe the necessity of synchronization and contain examples of how synchronization of the write signal can be achieved, such as by Schabes, Journal of Magnetism and Magnetic Materials 320, 2880-2884 (2008) and Albrecht et al., in *Nanoscale Magnetic Materials and Applications*, edited by Liu et al. (Springer, Dordrecht, 2009), pp. 237-274.

The frequency and phase of the write signals can be determined by reading synchronization fields on the disk with read head. The synchronization fields contain magnetic patterns which, when read by read head, allow for the correct synchronization information to be deduced.

In current practice, the read process is halted when writing any data because the read head senses noise from the write head during the write process. One drawback to halting the read process during writing is the inability to read synchronization fields while writing to the disk. Therefore, larger tolerance budgets are utilized for synchronizing the write signal to reduce the probability that the islands on the disk will be written incorrectly. This use of larger tolerance budgets ultimately reduces the bit density of the disk, which reduces the total storage available for storing data.

SUMMARY

Embodiments described herein compensate for noise sensed by the read head from the write head during the write process to synchronize the write process to a patterned magnetic disk. Compensating for the noise sensed by the read head eliminates the need to halt the write process when reading a synchronization signal from the disk to adjust the write process. By eliminating the need to halt the write process, a gap in writing data between synchronization fields and the data fields is reduced or eliminated, which increases the overall usable bit density of the disk. In addition, synchronization fields can be placed within data fields, which allow the synchronization signal to be read more often and allows the write process to be more frequently synchronized to the pattern on the disk to improve write accuracy.

One embodiment comprises a magnetic disk drive system including a patterned magnetic disk, a slider proximal to the disk, and a compensation system. The slider includes a write head operable to receive a write signal for writing to the data field. The slider also includes a read head operable to generate a synchronization signal when reading from the synchronization field, which may reside in a servo field and/or in the data field. The compensation system is operable to receive the synchronization signal, to process the synchronization signal to compensate for noise sensed by the read head while the write head is writing to the data field, and to adjust the write signal based on the processed synchronization signal.

Another embodiment comprises a compensation system for a magnetic disk drive system. The compensation system includes a compensation module and an adjustment module. The compensation module is operable to receive a synchronization signal read from a patterned magnetic disk by a read head and to compensate for noise sensed by the read head while a write head writes to the disk based on a write signal. The adjustment module is operable to adjust the write signal based on the processed synchronization signal.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 6 is a flow chart illustrating potential additional details of the method of FIG. 4 in an exemplary embodiment.

FIG. 7 illustrates capacitive coupling between a write head and a read head in an exemplary embodiment.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
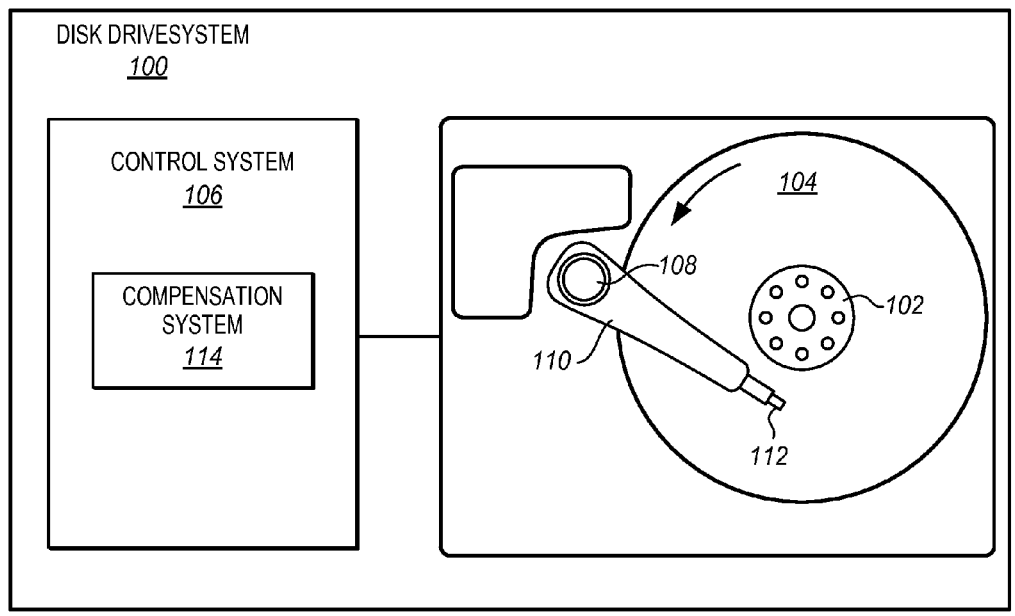
FIG. 1 illustrates a magnetic disk drive system in an exemplary embodiment.

FIG. 1 illustrates a magnetic disk drive system 100 in an exemplary embodiment. Disk drive system 100 includes a spindle 102, a patterned magnetic disk 104, a control system 106, an actuator 108, a suspension arm 110, a slider 112 having an assembly of write and read heads, and a compensation system 114. Spindle 102 supports and rotates disk 104 in a direction indicated by the arrow. Control system 106 controls the operation of disk drive system 100, such as coordinating the write process and the read process. A spindle motor (not shown) rotates spindle 102 according to control signals from control system 106. Suspension arm 110 supports slider 112. Actuator 108 rotates suspension arm 110 to position the assembly of write and read heads within slider 112 over a selected tracks on disk 104. Disk drive system 100 may include other components not shown in FIG. 1, such as a plurality of patterned disks, actuators, suspension arms, and sliders.

When disk 104 rotates, airflow generated by the rotation causes slider 112 to fly on a cushion of air at a very low elevation (fly height) over the rotating disk 104. As slider 112 flies on the air, actuator 108 moves suspension arm 110 to position a write head (not shown) and a read head (not shown) within slider 112 over selected tracks on disk 104. When the write head receives a write signal to write to disk 104 during a write process, ideally the write signal is synchronized to the pattern of magnetic islands on disk 104. To synchronize the write signal, synchronization fields on disk 104 are read by the read head to generate a synchronization signal. Normally, the read process is halted during the write process because the read head senses noise from the write head during a simultaneous read and write process to disk 104. In order to allow for synchronization of the write process while writing to disk 104, compensation system 114 is implemented in disk drive system 100. Compensation system 114 includes any device, component, or system operable to process the synchronization signals read from disk 104 to filter out noise generated from the write head that is sensed by the read head. Compensation system 114 is also operable to adjust the write signal based on the processed synchronization signals. Adjusting the write signal for the write head may result in the write signal being more accurately synchronized to the pattern on disk 104.

Figure 2:
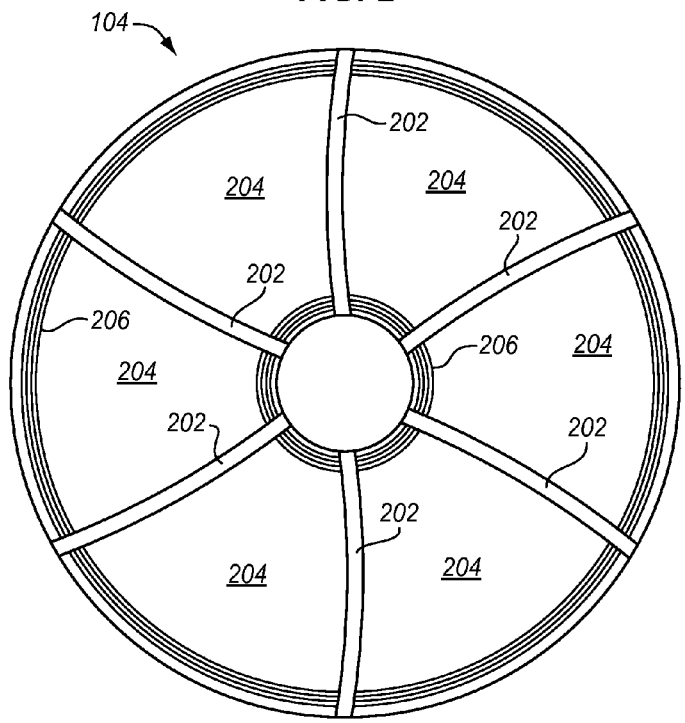
FIG. 2 illustrates a patterned magnetic disk.

FIG. 2 illustrates a patterned magnetic disk 104. Disk 104 includes a patterned array of magnetic islands (not shown) to store bits of data. Disk 104 includes servo fields 202 and data fields 204 within tracks 206. As disk 104 rotates within disk drive system 100, control system 106 utilizes actuator 108 to move suspension arm 110 radially across the surface of disk 104 to position the read head and the write head within slider 112 along selected tracks 206. Servo fields 202 include synchronization fields (not shown) which are read by the read head to generate the synchronization signals. Data fields 204 are utilized to store data written to disk 104 by the write head.

Figure 3:
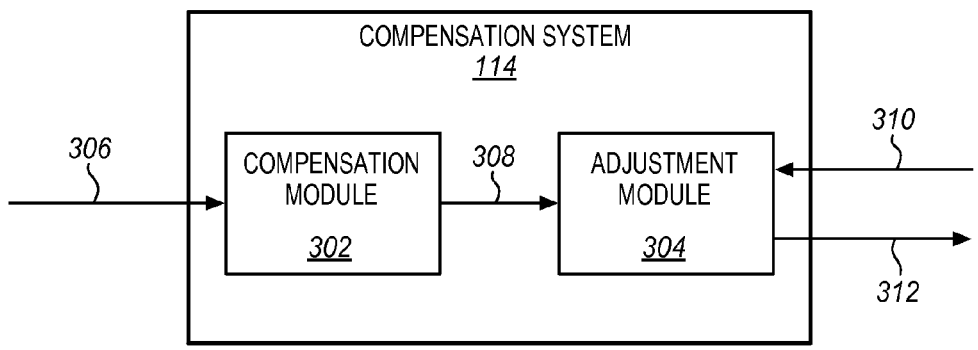
FIG. 3 illustrates a compensation system for a magnetic disk drive system in an exemplary embodiment.

FIG. 3 illustrates compensation system 114 in an exemplary embodiment. Compensation system 114 includes a compensation module 302 and an adjustment module 304. Compensation module 302 comprises any device, component, or system operable to receive a signal from the read head, and to process the signal to compensate for noise sensed by the read head while the write head writes to disk 104 based on a write signal. For example, in one embodiment, compensation module 302 may receive a synchronization signal 306 generated as the read head traverses synchronization fields on disk 104. Adjustment module 304 comprises any device, component, or system operable to adjust write signal 310. For example, in the previous embodiment, adjustment module 304 may receive a processed synchronization signal 308, receive write signal 310 from control system 106, and generate an adjusted write signal 312 for the write head.

Figure 4:
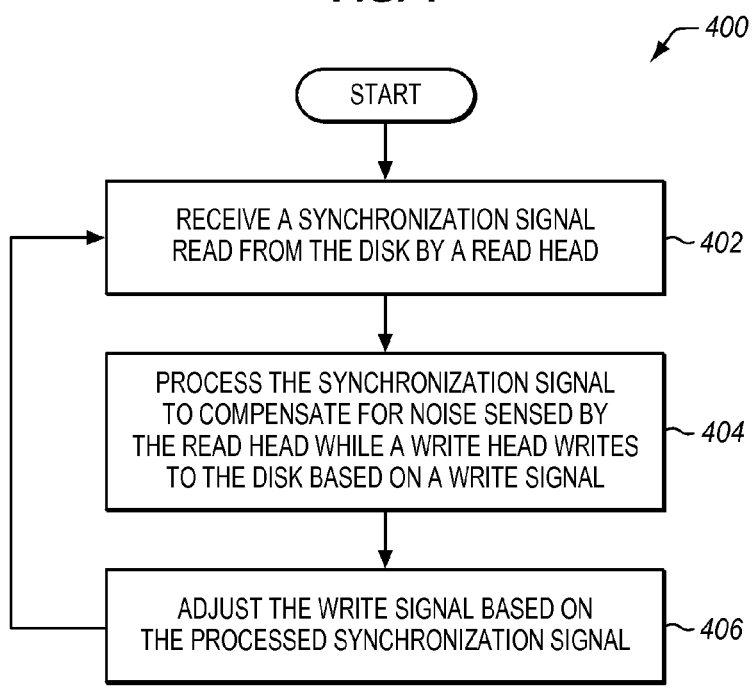
FIG. 4 is a flow chart illustrating a method of compensating a synchronization signal in an exemplary embodiment.

FIG. 4 is a flow chart illustrating a method 400 of compensating a synchronization signal in an exemplary embodiment. The steps of method 400 will be described with reference compensation system 114 of FIGS. 1 and 3, although one skilled in the art will recognize that method 400 may be performed by other systems. Also, the steps of the flow charts provided herein are not all inclusive and other steps, not shown, may be included. Further, the steps may be performed in an alternative order.

In step 402, compensation module 302 receives synchronization signal 306 generated by the read head as the read head traverses the synchronization fields. In one embodiment, synchronization signal 306 may be generated as the read head traverses the synchronization fields within servo fields 202 of FIG. 2 while the write head writes to data fields 204 of FIG. 2.

In step 404, compensation module 302 processes synchronization signal 306 to compensate for the noise sensed by the read head while the write head is writing to disk 104. The noise sensed by the read head may be caused by various factors including capacitive coupling between the read head and the write head and/or a magnetic coupling between the read head and the write head. For example, a simultaneous read/write process to disk 104 may be occurring. In a simultaneous read/write process, the write head is writing data to disk 104 while the read head is reading data from disk 104.

When processing synchronization signal 306, compensation module 302 may perform various filtering activities on synchronization signal 306 to reduce noise from the write head that is sensed by the read head.

In step 406, adjustment module 304 adjusts write signal 310 based on a processed synchronization signal 308 so that write signal 310 is synchronized to the pattern on disk 104. For example, adjustment module 304 may receive write signal 310 from control system 104, and generate adjusted write signal 312 based on processed synchronization signal 308. Adjusted write signal 312, when compared to write signal 310, may be more accurately synchronized to the pattern on disk 104. Thus, when adjusted write signal 312 is applied to the write head during the write process, the write process may be more accurately synchronized to the pattern on disk 104, which allows for an increase in the bit density for disk 104.

As compensation system 114 may perform steps 402-406 continuously, processing may return to and continue again with step 402.

Figure 5:
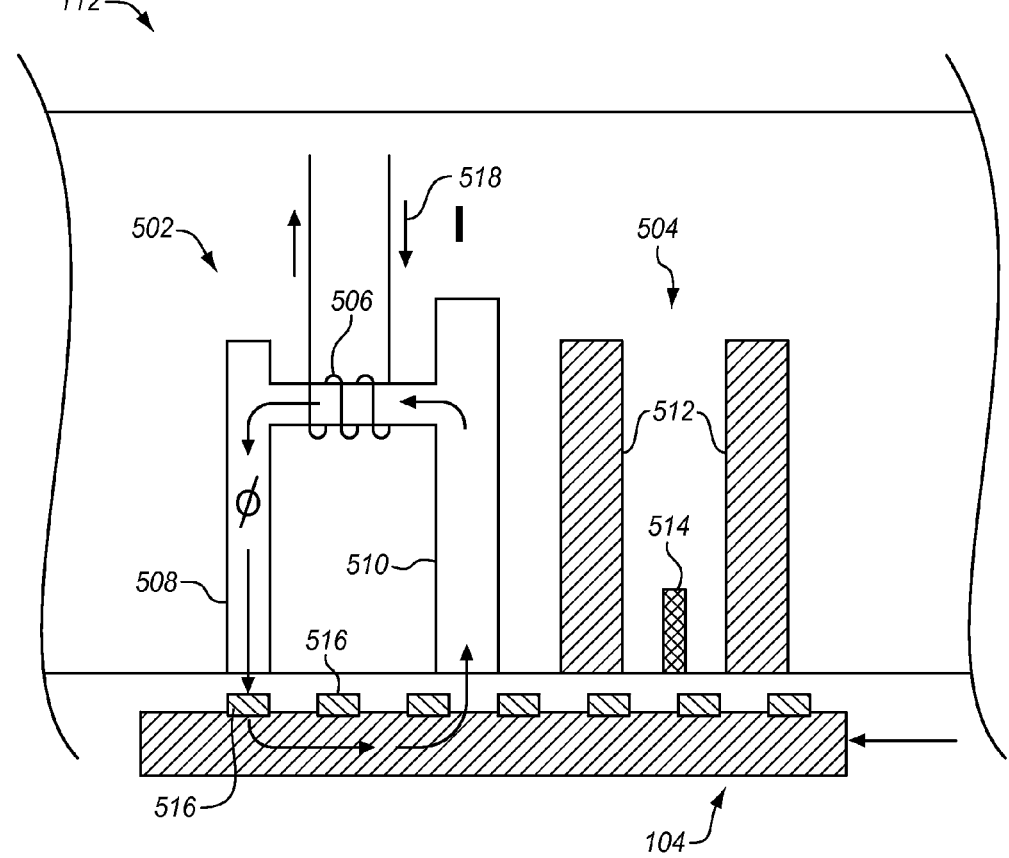
FIG. 5 illustrates a write head and a read head within a slider.

FIG. 5 illustrates a write head 502 and a read head 504 within slider 112. The various elements of FIG. 5 are illustrative in nature only, and one skilled in the art will recognize that write head 502 and read head 504 are not limited to any specific embodiment shown in FIG. 5. In FIG. 5, read head 504 includes one or more shields 512, which are used to provide a measure of magnetic shielding for a read sensor 514. Read sensor 514 travels over disk 104 in the direction of the arrow, reading the magnetic dipoles of magnetic islands 516. Write head 502 includes a magnetic pole 508, which transmits a magnetic flux ø generated by a write current 518 flowing through a magnetic field coil 506. The magnetic flux ø flows from magnetic pole 508 into disk 104 and records a bit of information on one of the magnetic islands 516 directly under the magnetic pole 508. The magnetic flux ø then returns via a return yoke 510. Because of the proximity of write head 502 to read head 504, noise may be sensed by read head 504 when write head 502 is writing data to disk 104.

FIG. 6 illustrates potential additional details of step 404 of FIG. 4 in an exemplary embodiment. The potential additional details illustrated in FIG. 6 will be described with reference compensation system 114 of FIGS. 1 and 3.

In step 602, compensation module 302 identifies a capacitive coupling factor between the read head 504 and the write head 502. Capacitive coupling between the read head 504 and the write head 502 may occur when electrical connections between the read head 504, the write head 502, and control system 106 are close together. For example, electrical connections between control system 106 and the read and write heads travel through slider 112, which forces the electrical connections close together. Capacitive coupling between the read head 504 and the write head 502 may also occur due to internal environmental conditions within disk drive system 100 acting as a dielectric between the read head 504 and the write head 502, such as a lubricant applied to the surface of disk 104, which may coat the ABS of slider 112. Capacitive coupling between the read head 504 and the write head 502 will be discussed in more detail with respect to FIG. 7 below.

FIG. 7 illustrates capacitive coupling between a write head 502 and a read head 504 in an exemplary embodiment. FIG. 7 illustrates write current 518, which generates write signal 310 across a resistance 708 in magnetic field coil 506 of write head 502. Also illustrated in FIG. 7 is resistor 710, which is illustrative of the magnetoresistance properties of read sensor 514 of FIG. 5, the resistance of which changes in the presence of a magnetic field such as the magnetic dipole formed within magnetic islands 516 on disk 104. When a sense current is injected into resistor 710, a voltage is generated which varies based on the magnetic fields under read sensor 514. A differential voltage 712 is sensed which varies based on the magnetic fields, which is used to read data stored in magnetic islands 516. FIG. 7 also illustrates that coupling capacitance 704 and 706 may form between write head 502 and read head 504. While not shown in FIG. 7, a similar set of coupling capacitances may form between the other write lead and the two read leads, so 704 and 706 are taken to represent the effective capacitances. In some cases, coupling capacitance 704 may be a different capacitance value than coupling capacitance 706. When the capacitance values are different, then a potential exists for noise from write head 502 to be coupled along one lead of read sensor 514 differently than across a different lead of read sensor 514. This is illustrated in FIG. 7 by coupling capacitance 704 connecting along one lead of resistor 710 and coupling capacitance 706 connecting along another lead of resistance 710. Ideally, the capacitance values of coupling capacitance 704 and coupling capacitance 706 would be the same capacitance value. When this is the case, reading the differential voltage across read sensor 514 would cancel out any noise common to both leads of read sensor 514. In order to balance capacitive coupling formed between write head 502 and read head 504, a compensation capacitor 702 may be included between write head 502 and read head 504 as illustrated in FIG. 7. Compensation capacitor 702 may be varied in capacitance value such that the parallel capacitance of compensation capacitor 702 and coupling capacitance 704 is substantially the same as the capacitance value of coupling capacitance 706. For example, compensation capacitor 702 may be included between read coils of read head 504 and write coils of write head 502 to balance the capacitive coupling between write head 502 and read head 504. Compensation capacitor 702 may be added to slider 112, to suspension arm 110, or within control system 106. Compensation capacitor 702 may also be placed between any two pairs of read and write leads to reduce the differential capacitance between the leads of write head 502 and read head 504. In addition, compensation capacitor 702 may be laser trimmed to modify the capacitance of compensation capacitor 702 to balance the capacitive coupling between write head 502 and read head 504.

In step 604, compensation module 302 identifies a magnetic coupling factor between read head 504 and write head 502. Magnetic coupling between read head 504 and write head 502 may occur when the magnetic flux ø generated by write head 502 interacts with the electrical connections to read head 504, such as electrical connections within slider 112 to read head 504. In some cases, the magnetic coupling may be directly coupled based on the close proximity of read head 504 to write head 502. In other cases, the magnetic coupling may be indirectly coupled from write head 502 to read head 504 through the magnetic material on disk 104 itself. When the magnetic coupling is indirect, various different magnetic patterns on disk 104 may cause the magnetic coupling between read head 504 and write head 502 to change as slider 112 travels along tracks 206. Some differences in magnetic patterns may be found, for example, between servo fields 202 as compared to data fields 204 of FIG. 2, and between synchronization fields as compared to data fields 204. Thus, it may be advantageous for compensation module 302 to utilize one magnetic coupling factor when read head 504 traverses servo fields 202 or the synchronization fields when processing synchronization signal 306, and a different magnetic coupling factor when read head 504 traverses data fields 204 when processing synchronization signal 306.

In step 606, compensation module 302 receives synchronization signal 306 generated by read head 504 from reading disk 104. Compensation module 302 may receive synchronization signal 306 from read head 504 in a manner similar to step 402 of FIG. 4. In step 608, compensation module 302 processes synchronization signal 306 based on a write signal for write head 502 and the capacitive coupling factor identified in step 502. Processing synchronization signal 306 compensates for the noise from write head 502 sensed by read head 504, and may be performed by a numerically subtracting from the synchronization signal 306 a high pass filtered write signal modified by the capacitive coupling factor. When write head 502 receives the write signal for writing to disk 104, the noise sensed by read head 504 is based upon the capacitive coupling factor between read head 504 and write head 502 and the write signal. For example, the write signal may generate a time varying voltage within write head 502, which may induce a time varying current within read head 504, which may be sensed as noise by read head 504. In addition, various different magnetic patterns on disk 104 may cause the capacitive coupling between read head 504 and write head 502 to change as slider 112 travels along tracks 206. Some differences in physical patterning on disk 104 may be found, for example, between servo fields 202 as compared to data fields 204 of FIG. 2, and between synchronization fields as compared to data fields 204. In some cases, the differences in physical patterning on disk 104 may result in different dielectric properties forming between read head 504 and disk 104, which may result in the capacitive coupling factor changing as read head 504 travels across disk 104. Thus, it may be advantageous for compensation module 302 to utilize one capacitive coupling factor when read head 504 traverses servo fields 202 or the synchronization fields when processing synchronization signal 306, and a different capacitive coupling factor when read head 504 traverses data fields 204 when processing synchronization signal 306.

In step 610, compensation module 302 processes synchronization signal 306 based on write current 518 generating write signal 310 and the magnetic coupling factor identified in step 504. When control system 106 generates write signal 310 for write head 502, write current 518 is utilized to generate the write signal. Write current 518, the magnitude of which may be up to fifty milliamps, generates a magnetic field in write head 502. When the magnetic field is generated, noise sensed by read head 504 is based upon the magnetic coupling factor identified in step 504, and write current 518. For example, write current 518 generates a magnetic field within write head 502, which may change the resistance of the magneto resistive sensor 514 and be sensed as noise in read head 504. In addition, processing synchronization signal 306 may include performing a numerical subtraction between write current 518 modified by the magnetic coupling factor and synchronization signal 306.

As compensation system 114 may perform steps 604-610 continuously, processing may return to and continue again with step 604. In step 604, compensation system 114 may vary the magnetic coupling factor based on the position of read head 504 along disk 104.

In an alternate embodiment, compensation system 114 may be utilized to compensate other servoing schemes in which an output signal may be compromised by capacitive and/or magnetic coupling to write head 502. For example, compensation system 114 may be utilized to compensate optical, thermal, or capacitive sensing methods for identifying positional information relative to disk 104.

Figure 8:
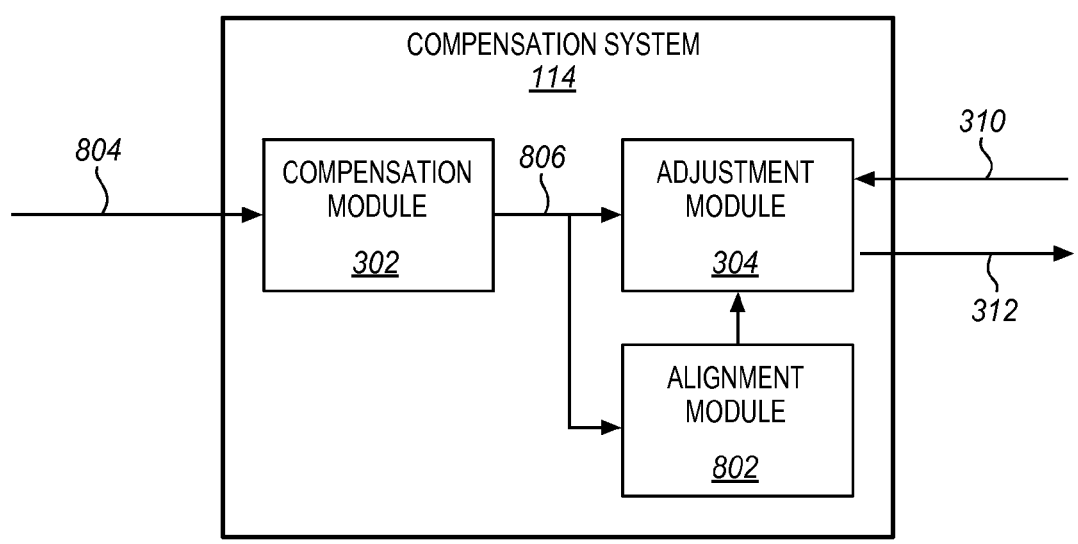
FIG. 8 illustrates an alternate compensation system for a magnetic disk drive system in an exemplary embodiment.

FIG. 8 illustrates an alternate compensation system 114 for disk drive system 100 in an exemplary embodiment. In addition to compensation module 302 and adjustment module 304, compensation system 114 of FIG. 8 further includes an alignment module 802. Alignment module 802 comprises any device, component, or system operable to identify a cross-track alignment for write head 502, and to determine if the cross-track alignment exceeds a threshold. If the threshold is exceeded, alignment module 802 may disable writing to disk 104 to prevent incorrectly writing to tracks adjacent to a track being written.

Figure 9:
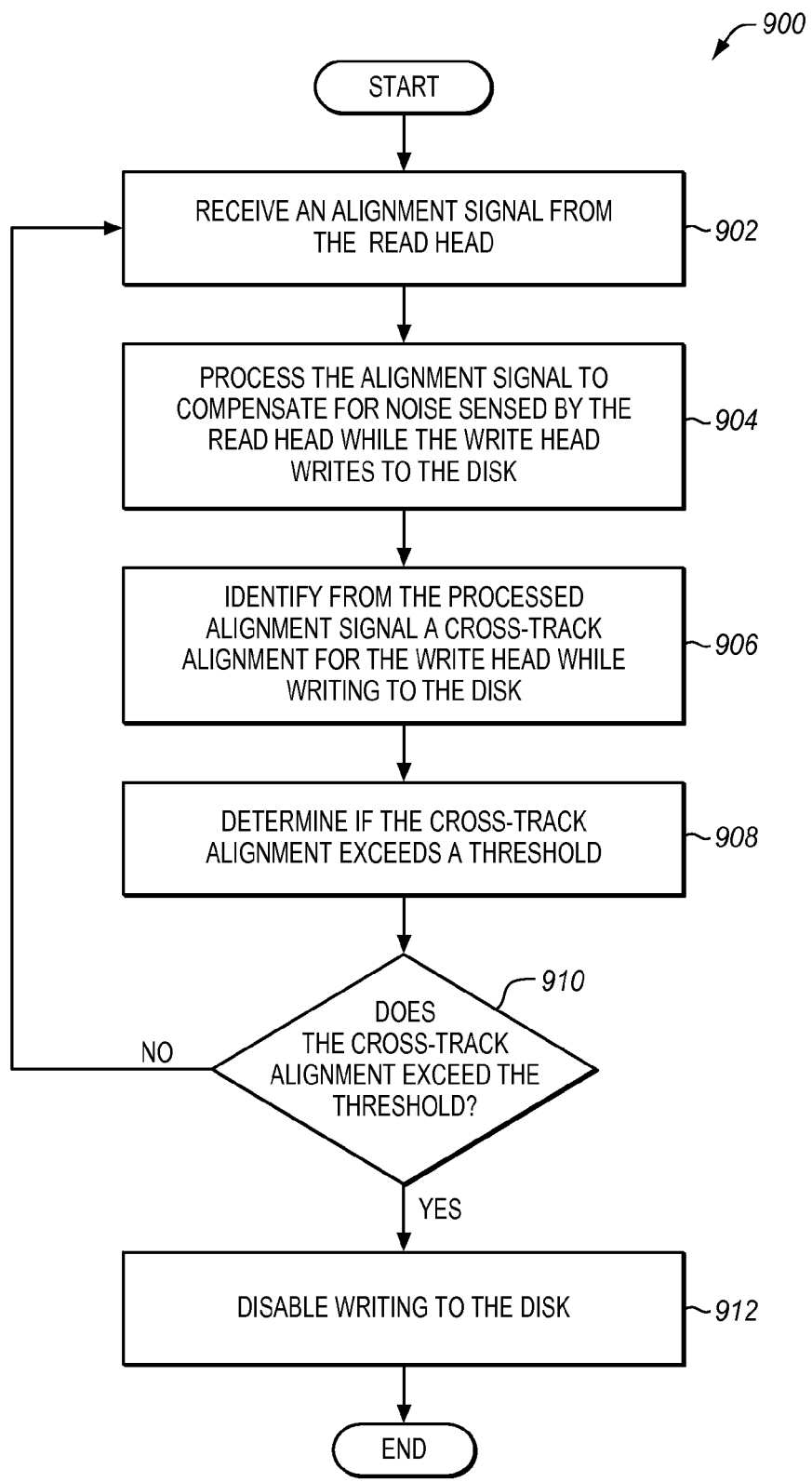
FIG. 9 is a flow chart illustrating a method of identifying cross-track alignment in an exemplary embodiment.

FIG. 9 is a flow chart illustrating a method 900 of identifying cross track alignment in an exemplary embodiment. The steps of method 900 will be described with reference to compensation system 114 of FIGS. 1 and 8.

In step 902, compensation module 302 receives an alignment signal 804 generated by read head 504 while reading from disk 104. In one embodiment, alignment signal 804 may be generated by read head 504 as read head 504 traverses position information fields on disk 104. In some cases, the position information fields may include ABCD bursts, chevrons, and the like. In another embodiment, alignment signal 804 may include reading data fields 204 to measure the root mean square of the amplitude of the signal generated by read head 504, as it may depend monotonically on the distance read head 504 is from the nearest data track. In step 704, compensation module 302 processes alignment signal 804 to compensate for the noise sensed by read head 504 while write head 502 is writing to disk 104.

In step 906, alignment module 802 identifies a cross-track alignment for write head 502 based on processed alignment signal 806. For example, while writing to disk 104, alignment module 802 may identify, based on processed alignment signal 806, that write head 502 is not center of a desired track. Ideally, write head 502 is center track to prevent inadvertently writing data to adjacent tracks.

In step 908, alignment module 802 determines if the cross-track alignment exceeds a threshold. For example, the cross-track alignment may vary slightly while writing to disk 104 without inadvertently writing data to adjacent tracks. However, if the cross-track alignment exceeds a threshold, then processing will continue with step 912. If the cross-track alignment does not exceed the threshold, then processing returns to step 902.

In step 912, alignment module 802 disables writing to disk 104. Subsequent to disabling writing to disk 104, control system 106 may re-try writing to disk 104 responsive to the cross-track alignment not exceeding the threshold.

Figure 10:
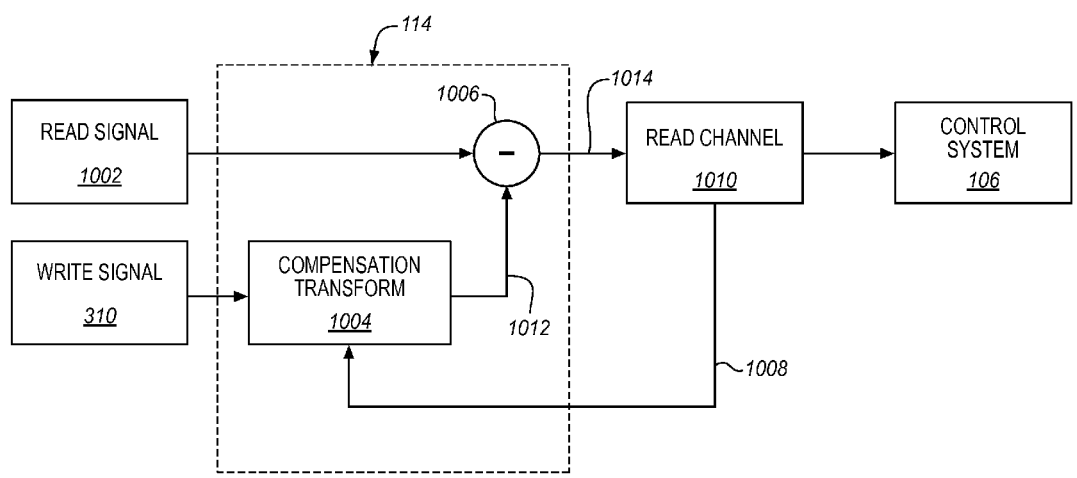
FIG. 10 illustrates an alternate compensation system for a magnetic disk drive system in an exemplary embodiment.

FIG. 10 illustrates an alternate compensation system 114 for a magnetic disk drive system 100 in an exemplary embodiment. In FIG. 10, compensation system 114 includes a compensation transform 1004 and a subtraction node 1006. Compensation transform 1004 comprises any device, component, or system operable to transform write signal 310 into a waveform that closely matches the noise sensed by read head 504 while writing to disk 104 using write head 502. In FIG. 10, read signal 1002 includes signals generated by read head 504 by reading disk 104, such as synchronization signal 306 and alignment signal 806. In some embodiments, read signal 1002 may include a position signal from one or more optical, thermal, and capacitive servoing schemes while write head 504 is writing to disk 104.

Compensation system 114 receives read signal 1002 and a noise estimation signal 1012 is generated by compensation transform 1004 based on write signal 310. Noise estimation signal 1012 is subtracted from read signal 1002 at node 1006 to generate a processed read signal 1014, which may then be transmitted along a read channel 1010 to control system 106 for write synchronization operations, cross-track alignment operations, or other operations based on processed read signal 1014. A feedback signal 1008 is used to modify compensation transform 1004. For example, feedback signal 1008 may modify parameters of compensation transform 1004 based on a position of read head 504 along disk 104.

The compensation performed by compensation transform 1004 is may be more clearly described in the language of discrete digital signal processing, where $c[m]=b_1w[m-1]+\ldots b_mw[1]-a_2c[m]-\ldots-a_nc[1]$.

Here w[m] and c[m] are write signal 310 and the compensation waveform at time m, respectively. The units of time are discrete and quantized in terms of relevant clock frequencies in the signal processing hardware used to implement the compensation.

In a preferred embodiment, the complexity of the compensation transformation may be reduced by focusing on reducing or eliminating the noise sensed by read head 504 resulting from capacitive and magnetic coupling between read head 504 and write head 502 while writing to disk 104. For reduction of the capacitive coupling, the compensation transformation is $c[m]=\alpha*(c[m-1]+w[m]-w[m-1])$. For reduction of the magnetic coupling, the compensation transformation is $c[m]=\beta*(w[m])$. The compensation waveforms may be combined, resulting in $c[m]=\alpha*c[m-1]+\alpha*w[m]-\alpha*w[m-1]+\beta*w[m]$.

It is understood to one skilled in the art that write signal 310 may be delayed or advanced in the transformation as needed in order to compensate for delays, latencies, and relaxation processes in the physical head-disk system or electronics. With these time shifts, the preferred compensation transformation is of the form: $c[m]=\alpha*c[m-1]+\alpha*w[m-d_1]-\alpha*w[m-1-d_1]+\beta*w[m-d_2]$. Compensation system 114 may adjust one or more of the $\alpha$, $\beta$, $d_1$, and $d_2$ parameters to reduce the noise sense by read head 504. In addition, the parameters may be allowed to vary as read head 504 travels along disk 104.

Figure 11:
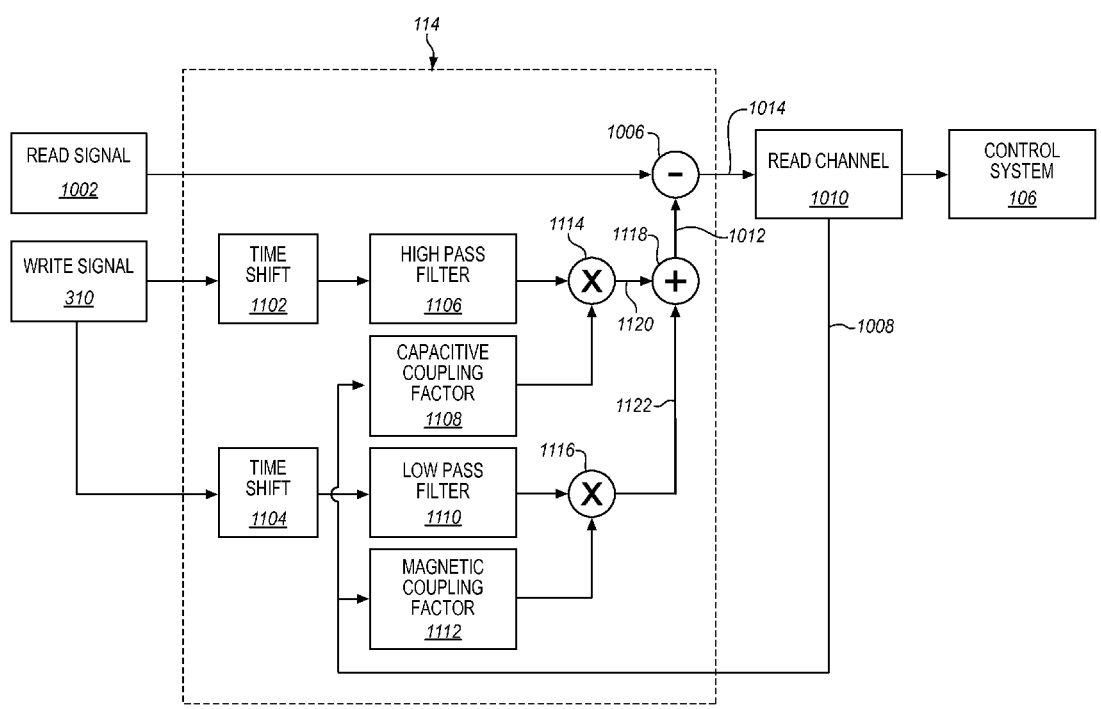
FIG. 11 illustrates another alternate compensation system for a magnetic disk drive system in an exemplary embodiment.

FIG. 11 illustrates another alternate compensation system 114 for a magnetic disk drive system 100 in an exemplary embodiment. In FIG. 11, compensation system 114 includes a time shift 1102, a time shift 1104, a high pass filter 1106, a capacitive coupling factor 1108, a low pass filter 1110, a magnetic coupling factor 1112, multiplication nodes 1114 and 1116, a summation node 1118, and subtraction node 1006. Time shift 1102 comprises any device, component, or system operable to delay or advance write signal 310 before write signal 310 is received by high pass filter 1106. Time shift 1104 comprises any device, component, or system operable to delay or advance write signal 310 before write signal 310 is received by low pass filter 1110. During the operation of compensation system 114 of FIG. 12, write signal 310 is high pass filtered and multiplied by node 1114 with capacitive coupling factor 1108 to generate an output 1120. High pass filtering of the write waveform creates a waveform that is analogous to the signal generated in read head 504 by the uncompensated capacitive coupling to write signal 310. The characteristic frequency of high pass filter 1106 is related to the resulting RC and LC time constants in the read and write system. The parameters of high pass filter 1106 and the capacitive coupling factor are chosen appropriately for a given read/write head so that the compensation waveform at output 1120 matches the noise sensed by read head 504 due to capacitive coupling to write signal 310. The parameters of high pass filter 1106 include the factors $\alpha$ and $d_1$ described earlier, but could also include additional transformation terms. Thus, any combination of digital filters or equalizers necessary to construct a suitable transformation of the write waveform to compensate for capacitive coupling is included as part of this invention.

Write signal 310 is also low pass filtered and multiplied by node 1116 with magnetic coupling factor 1112 to generate an output 1122. Low pass filtering of write waveform 310 creates a waveform that is analogous to the signal generated in read head 504 by magnetic coupling to the fields generated by the write process. The characteristic frequency of low pass filter 1110 is related the magnetic response times of the read/write system, which could be fast enough to eliminate or reduce the need for explicit low pass filtering. The parameters of low pass filter 1110 and the magnetic coupling factor are chosen appropriately for a given read/write head so that the compensation waveform at output 1122 matches the noise sensed by read head 504 due to magnetic coupling to fields generated by the write process. The parameters of low pass filter 1110 include the factors $\beta$ and $d_2$ described earlier, but could also include additional transformation terms. Thus, any combination of digital filters or equalizers necessary to construct a suitable transformation of the write waveform to compensate for magnetic coupling is included as part of this invention.

In FIG. 11, capacitive coupling factor 1108 and/or magnetic coupling factor 1112 may be modified by feedback 1108. In addition, high pass filter 1106 and low pass filter 1110 parameters may be modified by feedback 1008. Output 1120 and 1122 may then be summed at node 1108 to generate noise estimation signal 1012. Noise estimation signal 1012 is subtracted from read signal 1002 to generate a processed read signal 1014. Processed read signal 1014 may then be transmitted along a read channel 1010 to control system 106 for write synchronization operations, cross-track alignment operations, or other operations based on processed read signal 1014.

Figure 12:
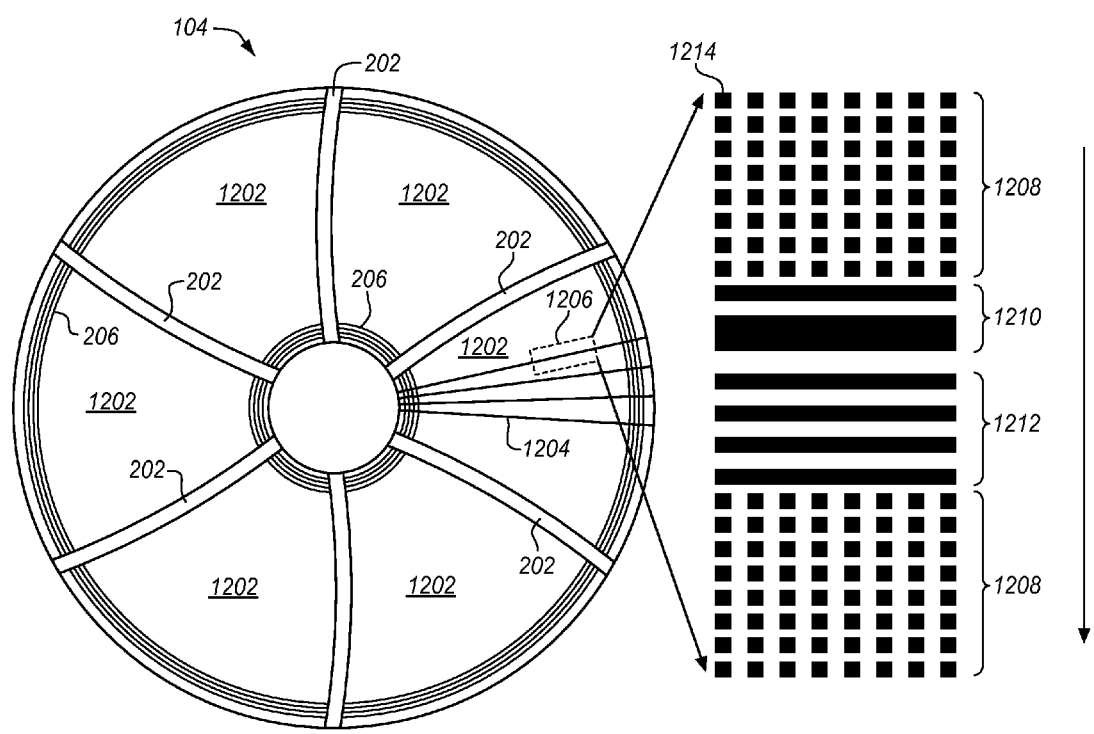
FIG. 12 illustrates a patterned magnetic disk in an exemplary embodiment.

FIG. 12 illustrates a patterned magnetic disk 104 in an exemplary embodiment. Disk 104 of FIG. 12 includes servo fields 202 and tracks 206 similar to FIG. 2, and may be read and/or processed with respect to systems and methods previously attributed to disk 104 of FIG. 2 In addition, FIG. 12 further illustrates sync/data regions 1202 including a number of composite fields 1204, which are detailed within view 1206. Composite fields 1204 include both data fields 1208 for storing bit data (e.g., bit region 1214) and a number of synchronization fields 1212. A synchronization header 1210 precedes synchronization fields 1216 and is utilized by control system 106 to identify the start of a synchronization process. The arrow indicates the direction of slider travel across composite fields 1204. In some embodiments, composite fields 1204 may include positioning information fields (not shown), such as ABCD bursts, chevrons, and the like.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A magnetic disk drive system comprising:
a patterned magnetic disk including a synchronization field and a data field;
a slider including a write head operable to receive a write signal for writing to the data field and a read head operable to generate a synchronization signal when reading from the synchronization field; and
a compensation system operable to receive the synchronization signal, to process the synchronization signal to compensate for noise sensed by the read head while the write head is writing to the data field, and to adjust the write signal based on the processed synchronization signal.

2. The magnetic disk drive system of claim 1 wherein the compensation system is further operable to process the synchronization signal based on the write signal for the write head and a capacitive coupling factor between the write head and the read head to compensate for the noise sensed by the read head.

3. The magnetic disk drive system of claim 2 wherein the compensation system is further operable to vary the capacitive coupling factor based on a position of the read head along the patterned magnetic disk to compensate for the noise sensed by the read head.

4. The magnetic disk drive system of claim 1 wherein the compensation system is further operable to process the synchronization signal based on a write current generating the write signal and a magnetic coupling factor between the write head and the read head to compensate for the noise sensed by the read head.

5. The magnetic disk drive system of claim 4 wherein the compensation system is further operable to vary the magnetic coupling factor based on a position of the read head along the patterned magnetic disk to compensate for the noise sensed by the read head.

6. The magnetic disk drive system of claim 1 wherein the compensation system is further operable to receive an alignment signal from the read head, to process the alignment signal to compensate for noise sensed by the read head while the write head is writing to the data field, and to identify a cross-track alignment for the write head while the data is written to the data field from the processed alignment signal.

7. The magnetic disk drive system of claim 6 wherein the compensation system is further operable to determine if the cross-track alignment exceeds a threshold, and to disable writing the data to the data field responsive to determining that the cross-track alignment exceeds the threshold.

8. The magnetic disk drive system of claim 1 wherein the compensation system is further operable to receive a position signal from one or more optical, thermal, and capacitive servoing schemes, and to process the position signal to compensate for noise sensed by the one or more optical, thermal, and capacitive servoing schemes while the write head is writing to the data field.

9. A compensation system for a magnetic disk drive system, the compensation system comprising:
a compensation module operable to receive a synchronization signal read from a patterned magnetic disk by a read head, and to process the synchronization signal to compensate for noise sensed by the read head while a write head writes to the patterned magnetic disk based on a write signal; and
an adjustment module operable to adjust the write signal based on the processed synchronization signal.

10. The compensation system of claim 9 wherein the compensation module is further operable to process the synchronization signal based on the write signal and a capacitive coupling factor between the read head and the write head to compensate for the noise sensed by the read head.

11. The compensation system of claim 10 wherein the compensation module is further operable to vary the capacitive coupling factor based on a position of the read head along the patterned magnetic disk to compensate for the noise sensed by the read head.

12. The compensation system of claim 9 wherein the compensation module is further operable to process the synchronization signal based on a write current generating the write signal and a magnetic coupling factor between the read head and the write head to compensate for the noise sensed by the read head.

13. The compensation system of claim 12 wherein the compensation module is further operable to vary the magnetic coupling factor based on a position of the read head along the patterned magnetic disk to compensate for the noise sensed by the read head.

14. The compensation system of claim 9 wherein:
the compensation module is further operable to receive an alignment signal from the read head, and to process the alignment signal to compensate for noise sensed by the read head while the write head is writing to the patterned magnetic disk, and
the compensation system further comprises:
an alignment module operable to identify a cross-track alignment for the write head based on the processed alignment signal.

15. The compensation system of claim 14 wherein the alignment module is further operable to determine if the cross-track alignment exceeds a threshold, and to disable the writing to the patterned magnetic disk responsive to determining that the cross-track alignment exceeds the threshold.

16. The compensation system of claim 9 wherein the compensation module is further operable to receive a position signal read from one or more optical, thermal, and capacitive servoing schemes identifying positional information relative to the patterned magnetic disk, and to process the position signal to compensate for noise sensed by the from one or more optical, thermal, and capacitive servoing schemes while a write head writes to the patterned magnetic disk based on a write signal.

17. A magnetic disk drive system comprising:
a patterned magnetic disk including synchronization fields within data fields;
a slider including a write head operable to receive a write signal for writing to the data fields and a read head operable to generate a synchronization signal when reading from the synchronization fields; and
a compensation system operable to receive the synchronization signal, to process the synchronization signal to compensate for noise sensed by the read head while the write head is writing to the data fields, and to adjust the write signal based on the processed synchronization signal.

18. The magnetic disk drive system of claim 17 wherein the compensation system is further operable to process the synchronization signal based on the write signal and a capacitive coupling factor between the write head and the read head, and to vary the capacitive coupling factor based on a position of the read head along the patterned magnetic disk to compensate for the noise sensed by the read head.

19. The magnetic disk drive system of claim 17 wherein the compensation system is further operable to process the synchronization signal based on a write current generating the write signal and a magnetic coupling factor between the write head and the read head, and to vary the magnetic coupling factor based on a position of the read head along the patterned magnetic disk to compensate for the noise sensed by the read head.

20. A method of compensating synchronization signals read from a patterned magnetic disk, the method comprising:
receiving a synchronization signal read from the patterned magnetic disk by a read head;
processing the synchronization signal to compensate for noise sensed by the read head while a write head writes to the patterned magnetic disk based on a write signal; and
adjusting the write signal based on the processed synchronization signal.

21. The method of claim 20 wherein processing the synchronization signal further comprises:
processing the synchronization signal based on the write signal and a capacitive coupling factor between the write head and the read head to compensate for the noise sensed by the read head.

22. The method of claim 21 wherein processing the synchronization signal further comprises:
varying the capacitive coupling factor based on a position of the read head along the patterned magnetic disk to compensate for the noise sensed by the read head.

23. The method of claim 20 wherein processing the synchronization signal further comprises:
processing the synchronization signal based on a write current generating the write signal and a magnetic coupling factor between the write head and the read head to compensate for the noise sensed by the read head.

24. The method of claim 23 wherein processing the synchronization signal further comprises:
varying the magnetic coupling factor based on a position of the read head along the patterned magnetic disk to compensate for the noise sensed by the read head.

25. The method of claim 20 further comprising:
receiving an alignment signal from the read head;
processing the alignment signal to compensate for noise sensed by the read head while the write head writes to the patterned magnetic disk; and
identifying a cross-track alignment for the write head while writing to the patterned magnetic disk based on the processed alignment signal.

26. The method of claim 25 further comprising:
determining if the cross-track alignment exceeds a threshold; and
disabling the writing to the patterned magnetic disk responsive to determining that the cross-track alignment exceeds the threshold.

27. The method of claim 20 further comprising:
receiving a position signal read from one or more optical, thermal, and capacitive servoing schemes for identifying positional information relative to the patterned magnetic disk; and
processing the position signal to compensate for noise sensed by the one or more optical, thermal, and capacitive servoing schemes while the write head writes to the patterned magnetic disk based on the write signal.

* * * * *